United States Patent [19]

Cayley, Jr.

[11] Patent Number: 5,167,405
[45] Date of Patent: Dec. 1, 1992

[54] FAST CHANGE SET-UP DEVICE FOR WORK ON WORK SUPPORT

[75] Inventor: Michael P. Cayley, Jr., Schaumburg, Ill.

[73] Assignee: Midaco Corporation, Elk Grove Village, Ill.

[21] Appl. No.: 747,955

[22] Filed: Aug. 21, 1991

[51] Int. Cl.⁵ .................................................. B23Q 3/02
[52] U.S. Cl. .................................... 269/309; 248/346; 269/95; 269/91
[58] Field of Search ..................... 269/91-95, 269/99, 100, 309, 311-314; 248/346, 416

[56] References Cited

U.S. PATENT DOCUMENTS

| | | | |
|---|---|---|---|
| 501,521 | 7/1893 | Marsh | 269/309 |
| 1,973,438 | 9/1934 | Lurba | 269/309 |
| 3,429,543 | 2/1969 | Mooney | 248/346 |
| 4,184,669 | 1/1980 | Bald | 269/309 |
| 4,502,656 | 3/1985 | Zeitler | 248/346 |
| 4,738,439 | 4/1988 | Satake | 269/309 |
| 4,881,727 | 11/1989 | Nemirovsky | 269/309 |

*Primary Examiner*—J. J. Swann
*Attorney, Agent, or Firm*—Hill, Van Santen, Steadman & Simpson

[57] ABSTRACT

A fast change set-up device for work on work supports wherein work blanks can be mounted to a number of work supports prior to machining and the upper work support can be quickly attached to a lower work support and locked thereto by rotating a handle so that the next piece can be machined. The shaft carries four cams for driving spring biased bolts which engage in grooves formed in locking pins and the cams have an indentation for locking the bolts in the grooves to hold the upper and lower work supports together so that machining can occur. After machining the upper work support can be removed from the lower work support and a second upper work support can be mounted to machine another workpiece.

6 Claims, 2 Drawing Sheets

U.S. Patent    Dec. 1, 1992    Sheet 1 of 2    5,167,405
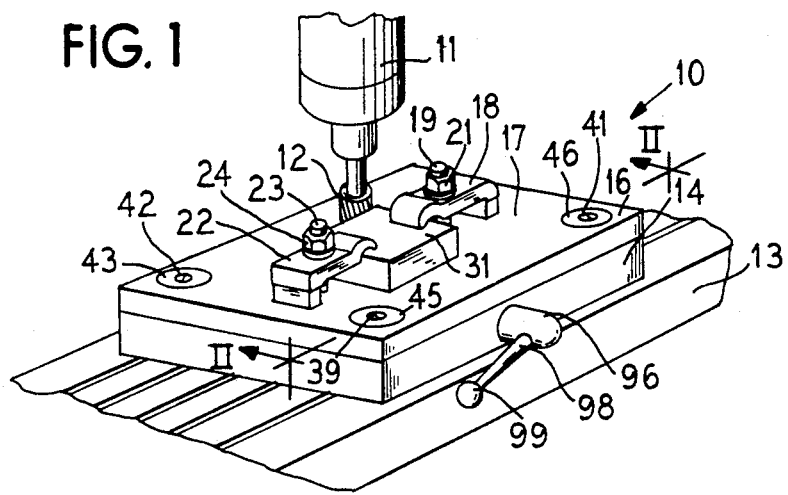
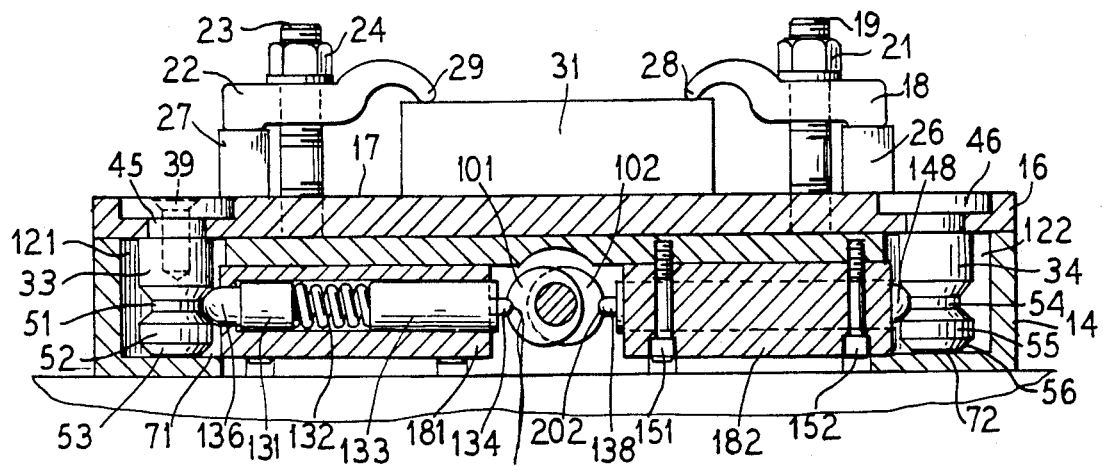
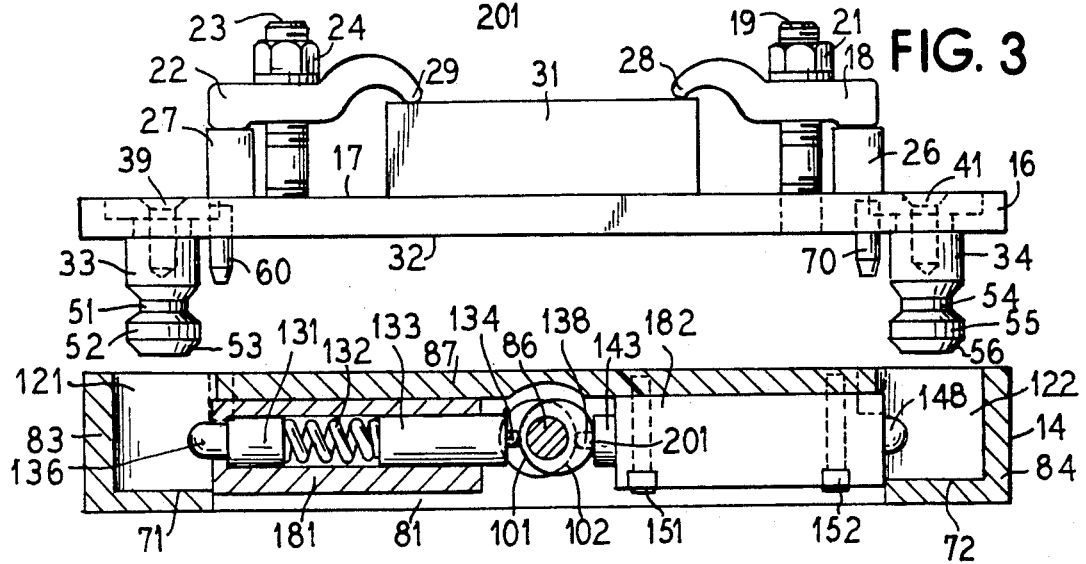

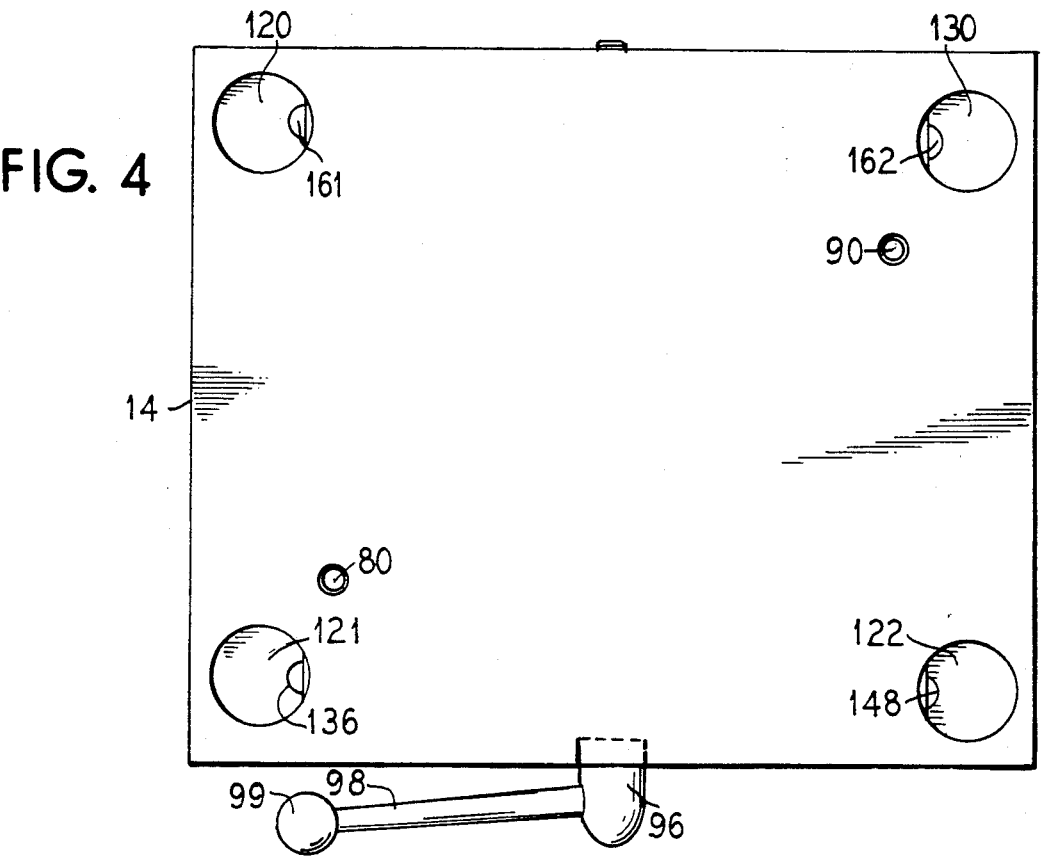
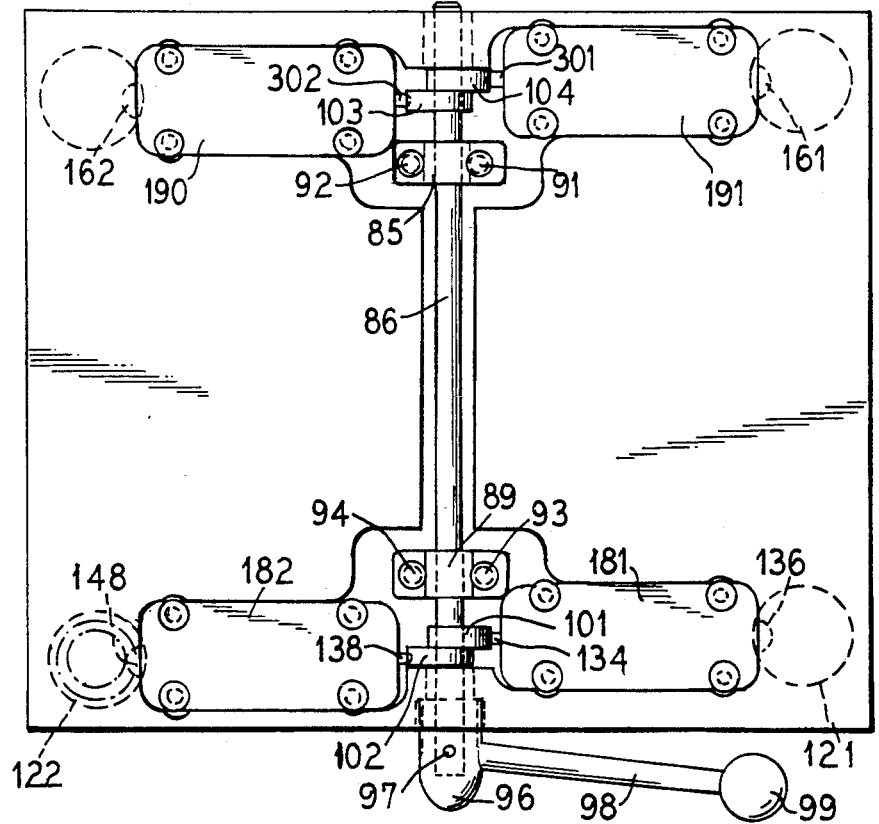

10

FAST CHANGE SET-UP DEVICE FOR WORK ON WORK SUPPORT

BACKGROUND OF THE INVENTION

1. Field of the Invention

This invention relates in general to a fast change set-up of work on a work support device and in particular to an improved work support.

2. Description of Related Art

Hydraulic and pneumatic interlocks for upper and lower work holders are known, but they do not disclose the mechanical features of the present invention.

SUMMARY OF THE INVENTION

The invention provides a lower work support formed with moveable locking bolts which are controlled by a shaft that carries cams so as to move the locking bolts and an upper support which has locking pins formed with grooves which are receivable in the lower work support such that when the locking shaft is rotated, cams will cause the locking bolts to engage the grooves in locking pins of the upper work support to lock the upper and lower work supports together so that a work piece attached to the upper work support can be machined.

A manually controlled shaft which carries four cams that respectively engage the four locking bolts provide a rapid and simple mechanism for locking the upper and lower work supports together. After the work piece has been machined, the upper work support can be removed from the lower work support by rotating the locking handle and another upper support with a new work piece can be then mounted on the work support and the second work piece can then be machined.

The invention provides that the workpieces can be set up on an upper work support member as another workpiece is being machined which allows faster production of finished parts.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view illustrating the invention;

FIG. 2 is a sectional view on lines II—II from FIG. 1 with the upper and lower work supports connected together;

FIG. 3 is a view showing the upper and lower work supports separated;

FIG. 4 is a top plan view of the lower work support; and

FIG. 5 is a bottom plan view of the lower work support.

DETAILED DESCRIPTION OF THE PREFERRED EMBODIMENTS

FIGS. 1, 2 and 3 illustrate the novel work support member 10 which comprises an upper support member 16 and a lower support member 14 which can be mounted to a table or bed 13 of a machine which might have a motor 11 upon which a cutting tool 12 is mounted. A workpiece 31 which is to be machined with the cutting tool 12 is mounted on the top surface 17 of the upper workpiece holder 16 by clamps 18 and 22 which have workpiece engaging ends 28 and 29. Bolts 19 and 23 receive nuts 21 and 24 so as to hold the workpiece clamps 18 and 22 down against the workpiece 31. Block members 26 and 27 of different sizes may be mounted between the clamps 18 and 22 and the surface 17 of the upper workpiece support member 16, as shown. Mounted adjacent the four corners of the upper workpiece supporting member 16 are locking pins such as 33 and 34 which are shown in FIGS. 2 and 3 which are mounted adjacent the rear edge of the upper workpiece support 16 relative to FIG. 1. Two additional pins are mounted adjacent the front edge relative to FIG. 1 of upper workpiece support 16.

The pin 33 is attached to the member 16 by a T-shape member 43 which is received in an opening in the upper surface 17 of member 16 and a bolt 39 passes through an opening in the member 43 and extends into the pin 33 as shown in FIGS. 2 and 3 to lock it to the member 16. Likewise a member 44 is received in an opening in the upper surface 17 of member 16 and a set screw 41 extends through the member 44 and locks the pin 34 to the member 16. Also extending from the lower surface 32 of the upper workpiece support 16 are guide pins 60 and 70 which are receivable in openings 80 and 90 of the lower work support member 14 as shown in FIG. 4 so as to properly align the upper and lower members 16 and 14.

Each of the four pins 33 and 34 and the two pins mounted at the other end of the upper support member 16 are formed with grooves such as the grooves 51 and 54 of the pins 33 and 34 and an enlarged head portion 52 and 55 are respectively formed beneath the grooves 51 and 54 and terminate in tapered portions 53 and 56 as shown in FIGS. 2 and 3, for example.

A lower support member 14 is formed with aligned openings 121, 122, 120 and 130 as illustrated in FIG. 4 for receiving the pins 33 and 34 and the other two pins at the other end of the upper support member 16 and the ends 53 and 56 of the pins 33 and 34 rest against the lower surfaces 71 and 72 of the openings 121 and 122 as shown in FIG. 2 when the upper and lower members 14 and 16 are joined together.

Locking bolts are slidably mounted in locking pin containers 181, 182, 190 and 191 which are received in recesses formed in lower member 14.

Bolts such as 151, 152 hold the bolt support 182 to the member 14 and similar bolts hold the other bolt supports 181, 190 and 191 to the member 14.

Details of the pin support 181 are shown in FIGS. 2 and 3 and other three pins supports have similar structures. A locking bolt portion 131 is received in an opening in bolt support 181. Bolt portion 131 has a projection 136 which is receivable in the groove 51 of the bolt 33 when pin 131 is extended. The member 131 bears against a coil spring 132 which has its other end in contact with a member 133 which has a cam follower portion 134 which engages a cam 101 mounted on a shaft 86. The cam 101 has a high portion and a low portion with a detent 201 formed in the high portion such that when the portion 134 fits into the detent 201, the locking bolt 136 will be locked in the groove 51 of the pin 33. FIG. 2 illustrates the locking bolt 136 in the locked position in the groove 51 of pin 33 locking the upper work support 16 to the lower work support member 14.

As shown in FIGS. 4 and 5, the shaft 86 is supported by bearing members 85 and 89 which are connected to the lower support member 14 by set screws 91, 92 and 93 and 94, respectively, and a control shaft 98 has a sleeve 96 which is connected by pin 97 to the shaft 86 and a knob 99 is mounted on the end of shaft 98 as shown in FIGS. 4 and 5.

Cams 101, 102, 103 and 104 are mounted on the shaft 86 as shown in FIG. 5 and control the positions of the locking bolts 136, 148, 161 and 162 in the manner shown in FIGS. 2 and 3. It is to be noted that the cams 101, 102 are offset so that they are mounted adjacent each other and thus the actuating bolts 134 and 138 and the members 181 and 182 are offset as best shown in FIG. 5 so that the cam follower portions 134 and 138, respectively engage the cams 101 and 102. Likewise, the cam follower portions 301 and 302 are offset so that they can respectively engage the cams 104 and 103 as shown in FIG. 5.

In operation, at least two of the upper workpiece holder 16 are provided and workpieces 31 are suitably mounted on each of the upper work supports 16. One of the upper work supports 16 with the workpiece 31 mounted thereon is attached to the lower work support 14 by moving it into the position as shown in FIG. 3 so that the alignment pins 60 and 70 will be received in the openings 80 and 90 of the lower workpiece 14 and such that the pins 33 and 34 and the other two pins, not shown, will be received in the aligned openings in the lower workpiece 14. The shaft 86 is positioned by the handle knob 99 to the position shown in FIG. 3 so that the locking bolt members 136 and 148 and the associated locking bolt members 161 and 162 are substantially retracted so as to allow the heads 52 and 55 of pins 33, 34 and the equivalent heads of the other two pins, not shown, to clear the locking bolt members 136 and 148 so that the ends 53 and 56 engage the lower surfaces 71 and 72 of the lower workpiece 14. Then the handle knob 99 is turned to rotate shaft 86 to the position shown in FIG. 2 wherein the bolt ends 134 and 138, 301 and 302 respectively lock in detents 201, 202 and similar detents in cams 103 and 104 and this moves the member 133 and the associated members of the other three locking bolt means to the position shown in FIG. 2 wherein the spring 132 is compressed and the bolt 136 firmly bears against the pin 33 in the groove 51 and the bolt 148 firmly bears against the pin 34 in the groove 54. Likewise, the bolts 161 and 162 are firmly pressed into the grooves of the other two pins, not shown, which extend from the upper work support member 16. It is to be realized, of course, that the lower support member 14 is firmly attached and indexed to the work table 13 of the machine and the cutting tool 12 can be utilized to machine the workpiece 31. After the workpiece 31 has been machined, the shaft 86 can be rotated by the knob 99 to the position shown in FIG. 3 which retracts the locking bolts 136, 148, 161 and 162 from the grooves 51 and 54 in the pins 33 and 34 and the equivalent grooves in the pins not shown so that the upper work support member 16 can be withdrawn from the lower support member. Then another upper support member 16 can be mounted on the lower support member in the same manner that the first upper support member was mounted and the shaft 86 can be rotated to lock it to the lower support member so that the second workpiece can be machined.

It is seen that this invention provides a new and novel fast change setup of work on the work support and although the invention has been described with respect to preferred embodiments, it is not to be so limited as changes and modifications can be made which are within the full intended scope of the invention as defined by the appended claims.

We claim as our invention:

1. A quick set-up work support for a tool mounted above a tool bed comprising, an upper planar work support member, a lower planar work support member, means for attaching a workpiece to the upper surface of said upper work support member, means for attaching said lower work support member to said bed, a plurality of pins which are formed with grooves attached to said upper work support member and extending downwardly therefrom, a plurality of openings formed in said lower work support member and aligned with said plurality of pins which are attached to said upper work support member, a plurality of locking bolts moveably mounted in said lower work support member and each respectively moveable into said plurality of openings so as to engage the grooves of said pins to lock said upper and lower work support members together, a locking shaft rotatably supported by said lower work support member, a plurality of cams mounted on said locking shaft and each of said cams engageable with one of said plurality of locking bolts, and means for rotating said locking shaft to lock and unlock said upper and lower work support members.

2. A quick set-up work support according to claim 1 wherein said means for rotating said locking shaft comprises a pivot handle connected to said locking shaft.

3. A quick set-up work support according to claim 2 comprising a plurality of springs each of which engages one of said locking bolts to bias it toward the locked position.

4. A quick set-up work support according to claim 3 wherein each of said cams has a high portion and a low portion.

5. A quick set-up work support according to claim 4 wherein each of said cams is formed with a detent to lock said locking bolt in the locked position.

6. A quick set-up work support according to claim 4 wherein adjacent locking bolts are mounted such that their ends which engage said cams are offset relative to the longitudinal direction of said locking shaft.

* * * * *